Oct. 19, 1965
G. J. PHILIPPI
3,212,950
TAPING DEVICE
Filed March 5, 1962
9 Sheets-Sheet 1
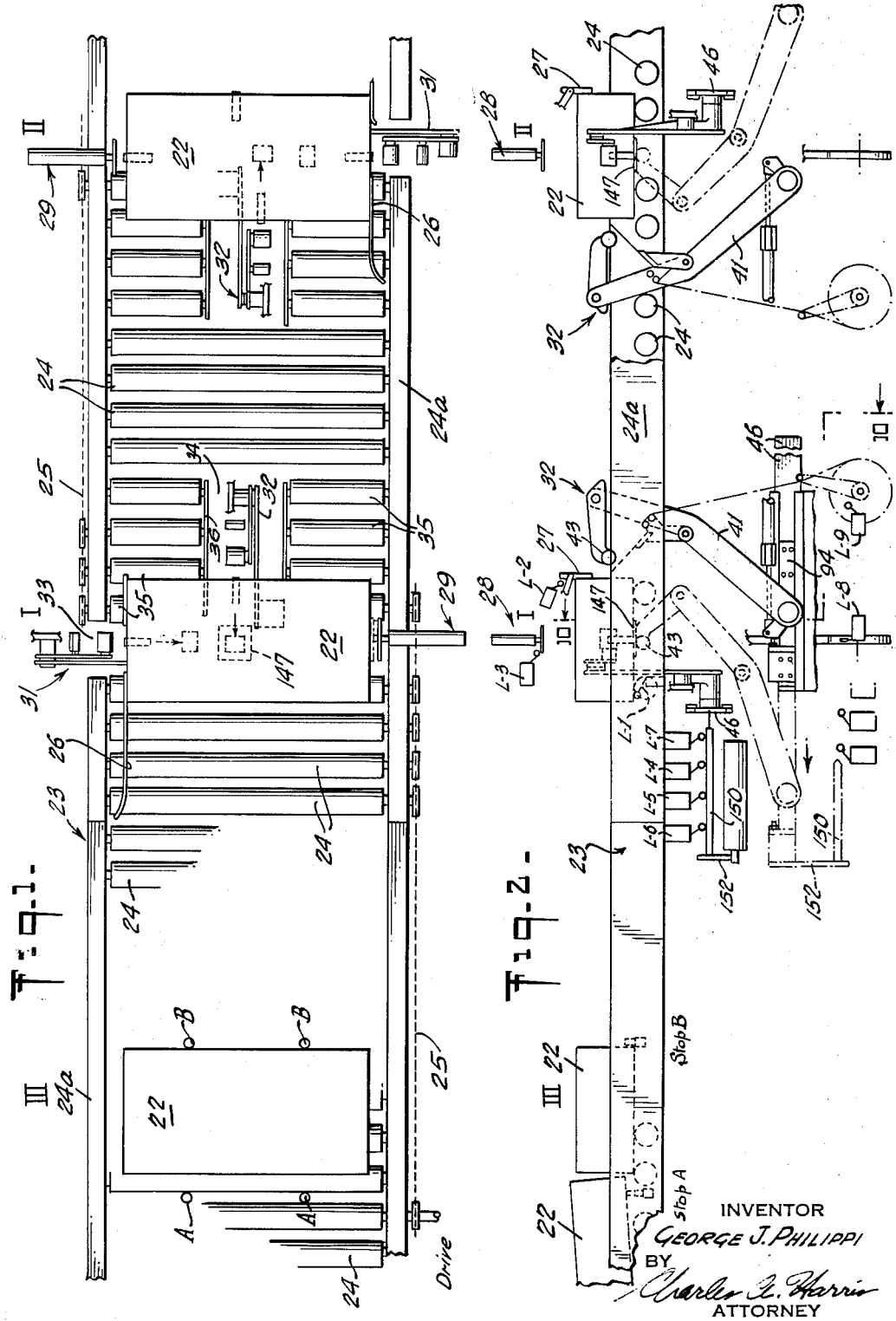
INVENTOR
GEORGE J. PHILIPPI
BY
Charles T. Harris
ATTORNEY Oct. 19, 1965  G. J. PHILIPPI  3,212,950
TAPING DEVICE
Filed March 5, 1962  9 Sheets-Sheet 2
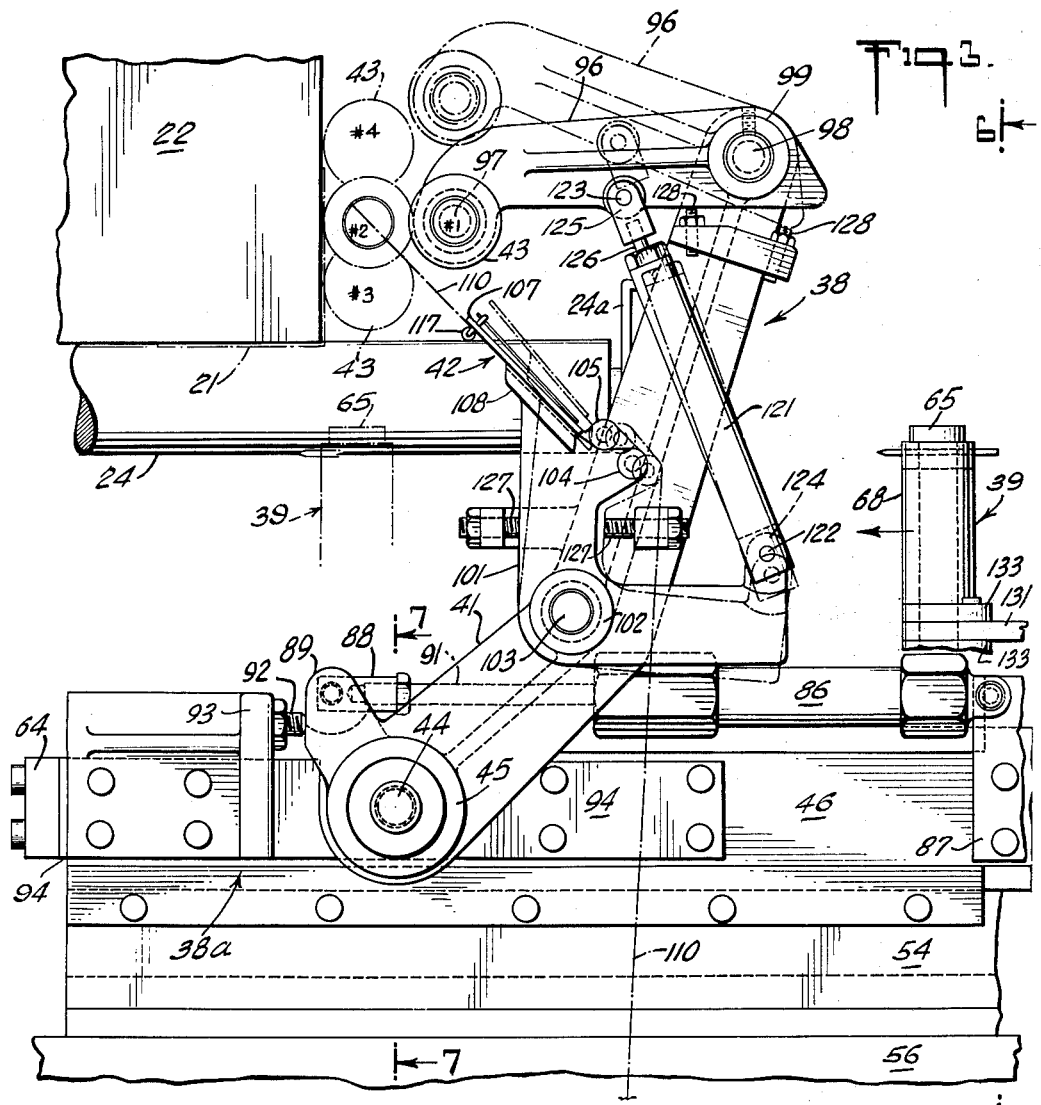
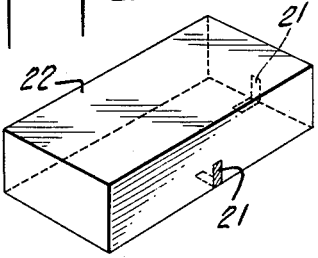
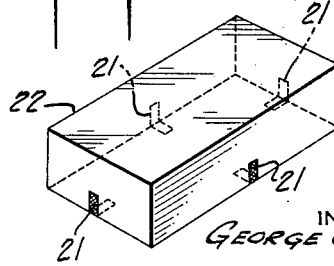
INVENTOR
GEORGE J. PHILIPPI
BY
Charles A. Harris
ATTORNEY Oct. 19, 1965
G. J. PHILIPPI
3,212,950
TAPING DEVICE
Filed March 5, 1962
9 Sheets-Sheet 3
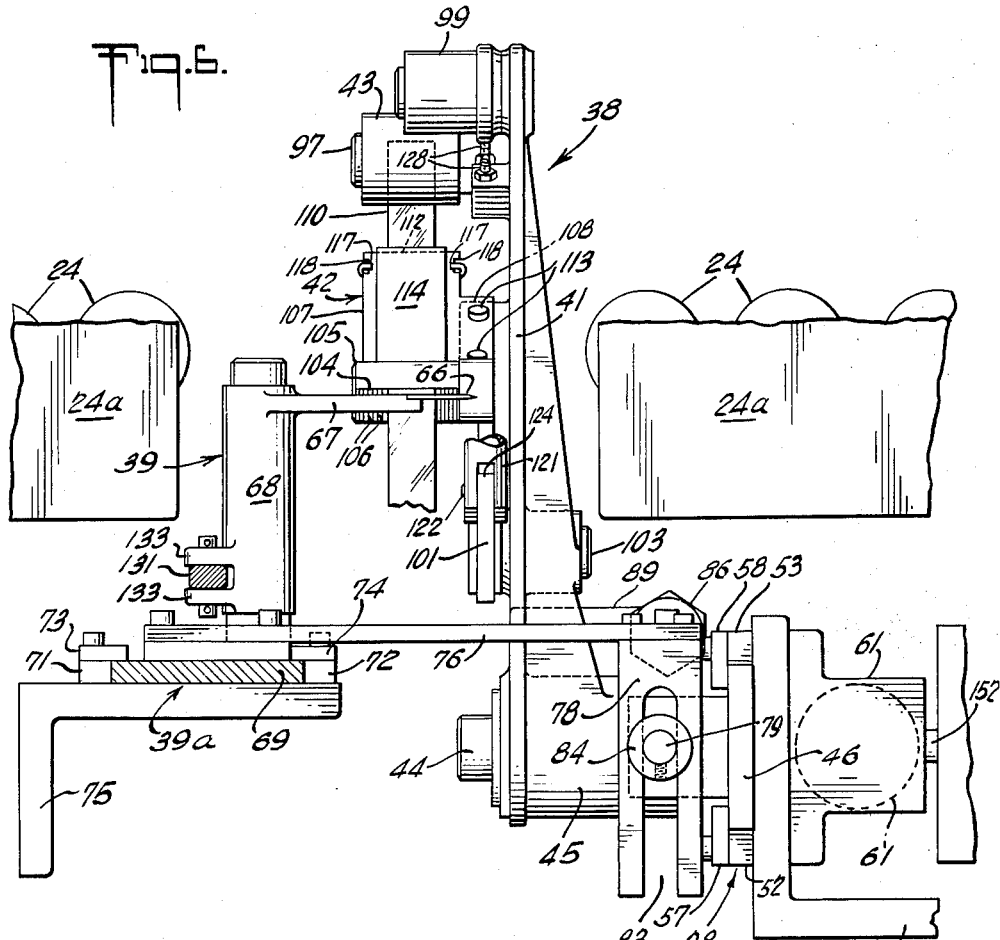
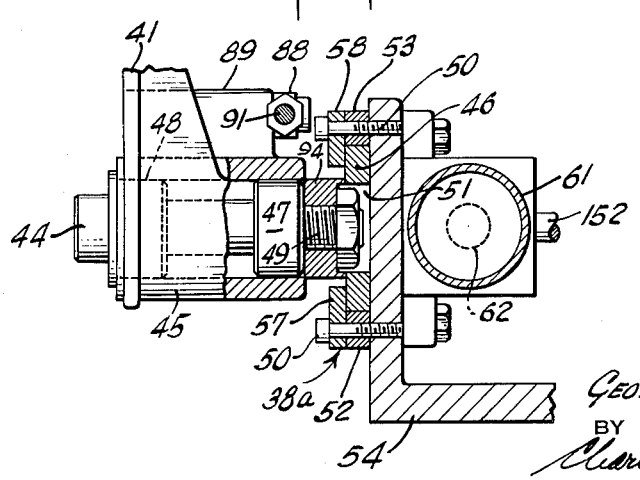
INVENTOR
GEORGE J. PHILIPPI
BY
Charles A. Harris
ATTORNEY Oct. 19, 1965   G. J. PHILIPPI   3,212,950
TAPING DEVICE
Filed March 5, 1962   9 Sheets-Sheet 4
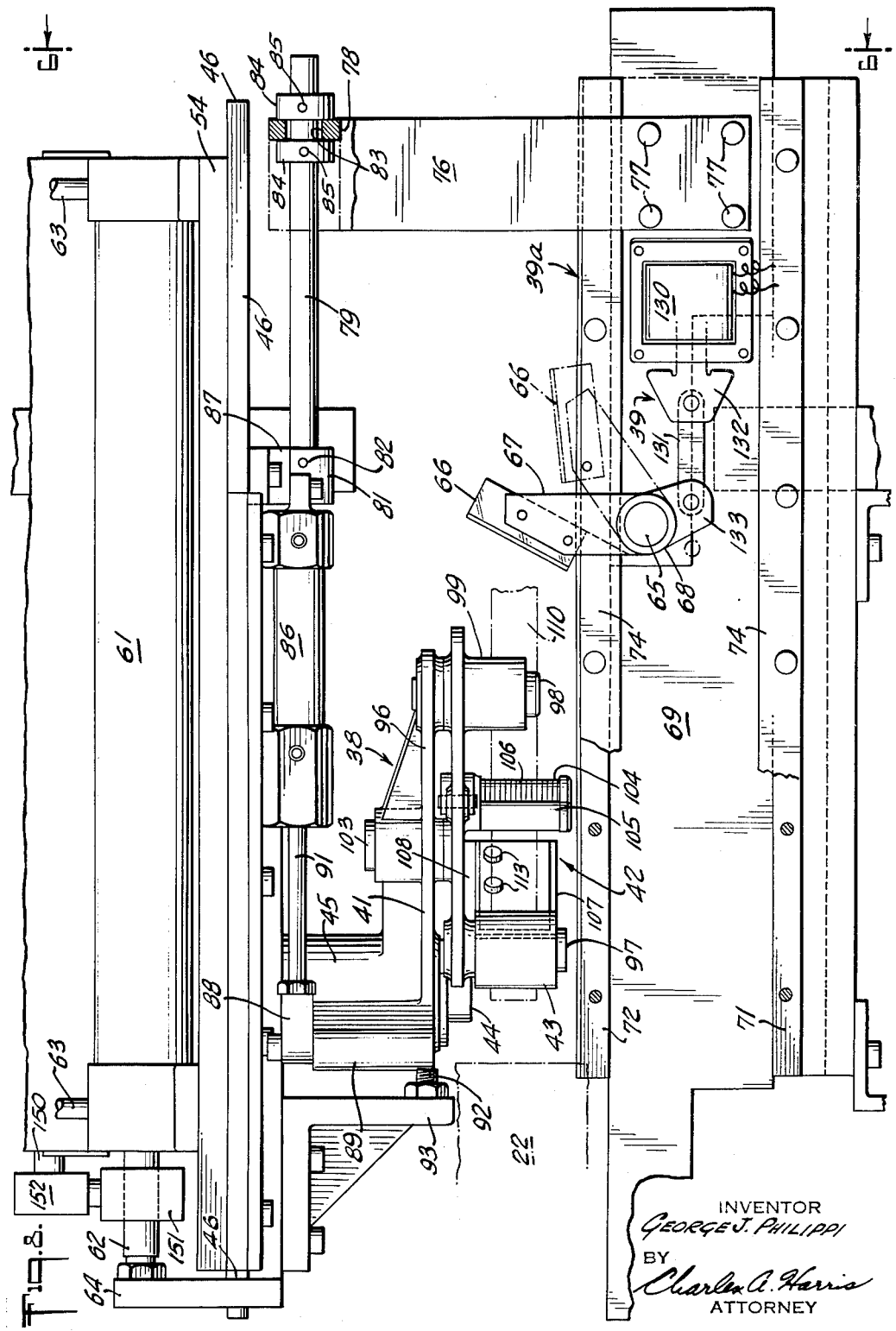
INVENTOR
GEORGE J. PHILIPPI
BY
Charles A. Harris
ATTORNEY Oct. 19, 1965   G. J. PHILIPPI   3,212,950
TAPING DEVICE
Filed March 5, 1962   9 Sheets-Sheet 5

INVENTOR
GEORGE J. PHILIPPI
BY
Charles A. Harris
ATTORNEY

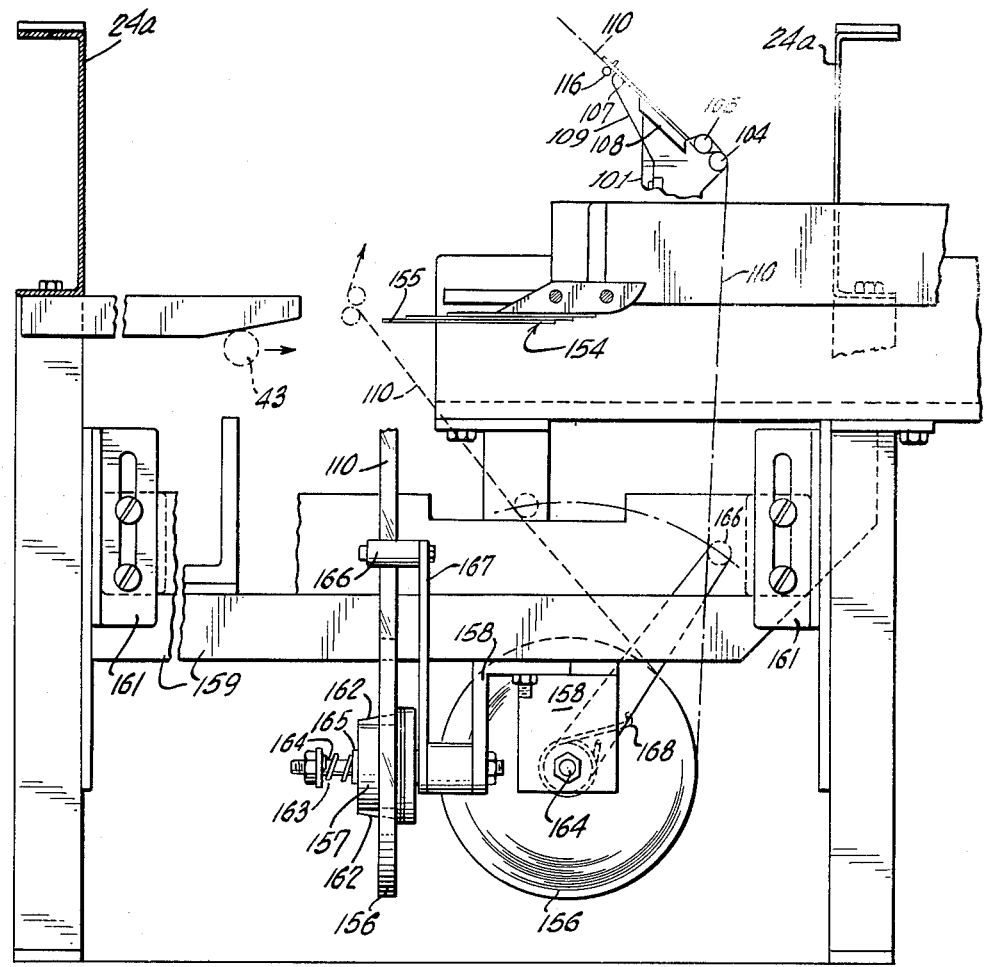

Oct. 19, 1965
G. J. PHILIPPI
3,212,950
TAPING DEVICE
Filed March 5, 1962
9 Sheets-Sheet 7
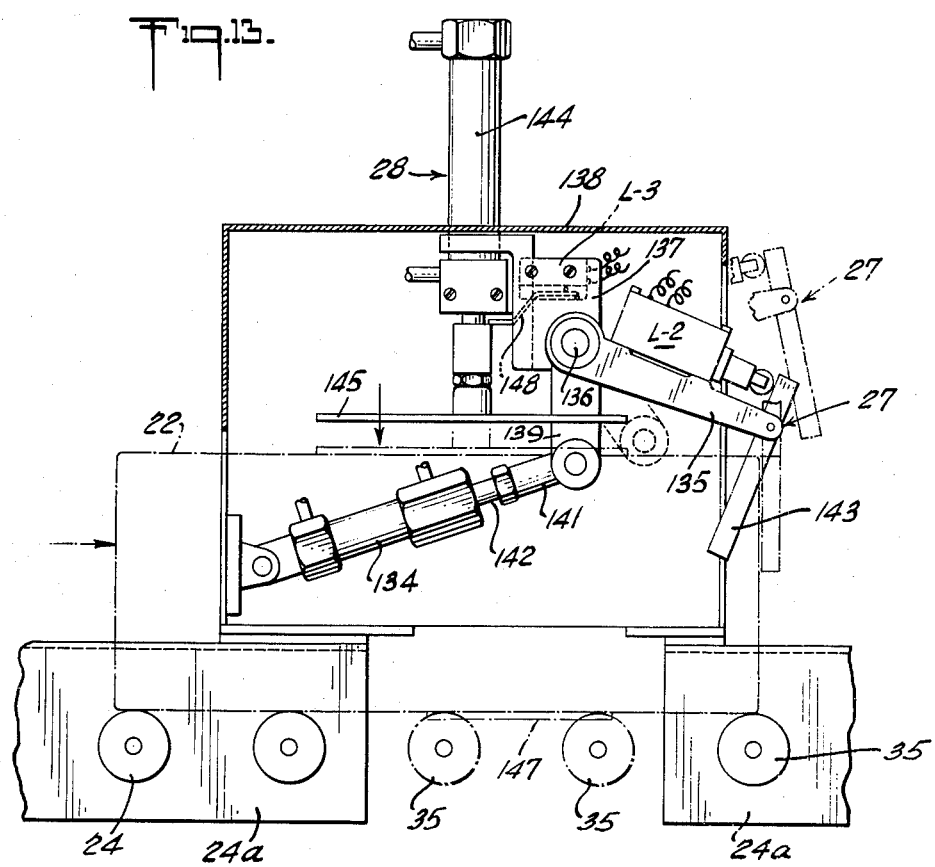
INVENTOR.
GEORGE J. PHILIPPI
BY
Charles A. Harris
ATTORNEY

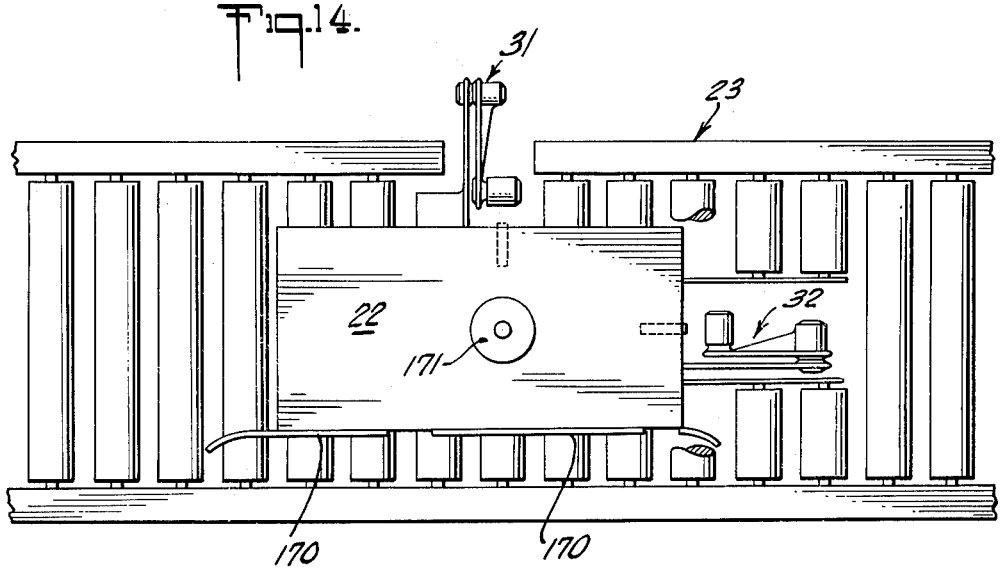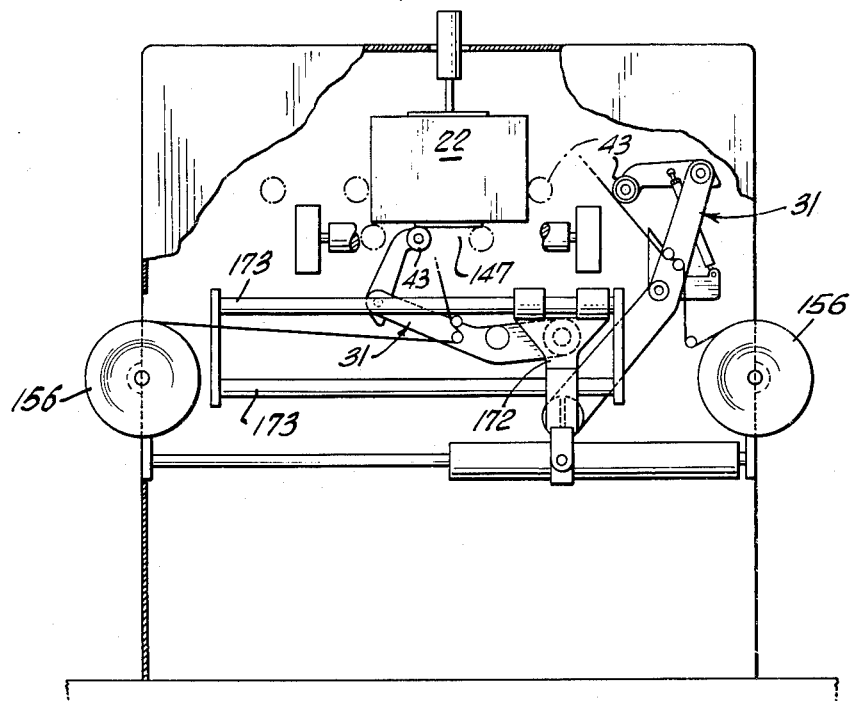

Oct. 19, 1965  G. J. PHILIPPI  3,212,950
TAPING DEVICE
Filed March 5, 1962  9 Sheets-Sheet 9
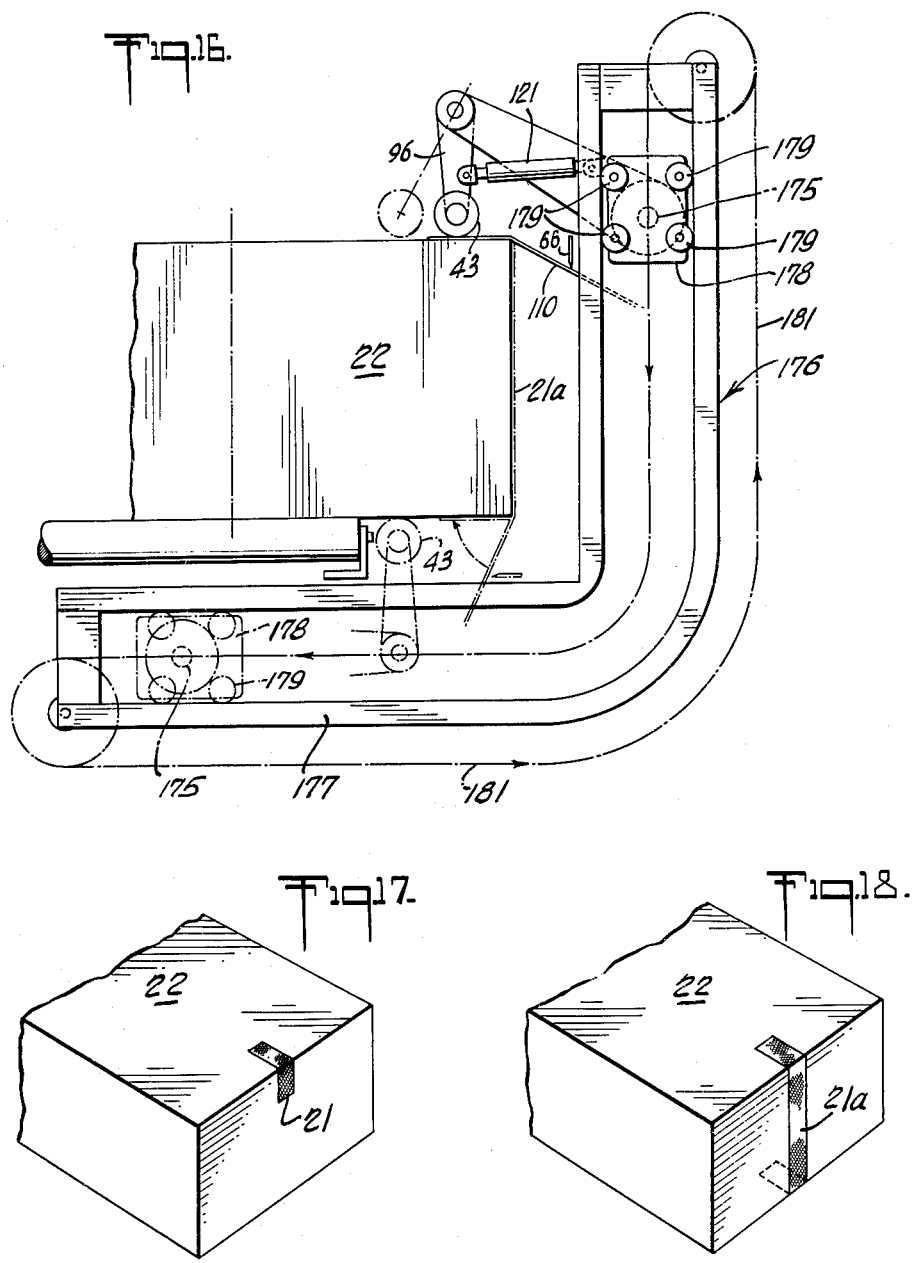
INVENTOR
GEORGE J. PHILIPPI
BY
Charles A. Harris
ATTORNEY United States Patent Office 3,212,950
Patented Oct. 19, 1965

3,212,950
TAPING DEVICE
George Jacob Philippi, Plainfield, N.J., assignor to Johnson & Johnson, a corporation of New Jersey
Filed Mar. 5, 1962, Ser. No. 177,548
6 Claims. (Cl. 156—351)

The present invention relates to devices for applying pressure-sensitive adhesive tape in predetermined lengths to successive articles positioned for taping; more particularly to devices of this type for applying lengths of tape around the corners of rectangular articles such as boxes or cartons for fastening the boxes together and for holding them closed.

Heretofore devices for applying tape in this manner have been manually operable, or operable in response to movement of the article to be taped past or through the taping device. In the latter case, the length of tape can only be applied to the article in the direction of movement of the article past the taping device. Thus, the only way that tape can be applied to all sides of the article by this technique is to rotate the article to present each side successively to the taping device, or devices, if more than one are used.

The present invention contemplates a fully automatic device for applying such lengths of tape to successive articles, such as boxes or cartons, positioned with respect thereto. This device comprises an automatic taping head or heads operable in response to the positioning of the article in a taping position to apply tape to the article. The movement of the taping heads is independent of the direction of movement of the articles into and out of the taping position and several heads may operate at one time to apply tape to different portions of the same article.

For instance, if the article to be taped is a rectangular box and it is desired to place L shaped lengths of tape around the corners formed between the bottom of the box and each of its two sides and two ends, four in all, two taping heads may be employed to apply automatically the L shaped lengths of tape to the box in one taping position. Then the box may be moved to a second taping position where two more heads automatically apply the remaining two lengths of tape to the box in the desired locations. All of this may be accomplished without rotating or turning the box. Thus, the box may be moved in only one direction past or through the taping device or devices by some simple automatic conveying means, such as a belt or conveyor table having driven rollers. Suitable stops, guides, or clamps controlled by contact or limit switches responsive to the location of the box may be provided for holding the box in taping position and releasing it when the desired length of tape is applied thereto.

The present invention also contemplates a novel taping head which is adapted to approach a box to be taped and, on contact therewith, automatically apply an L shaped length of pressure-sensitive adhesive tape to a corner of the box in such a way that the tape is fully adhered to the box all along its length.

Other advantages of this invention will be apparent from the following descriptions and claims taken together with the drawings wherein, FIG. 1 is a somewhat schematic plan view of an automatic taping device according to one embodiment of this invention wherein two heads are employed in each of two taping positions.

FIG. 2 is a schematic side view in elevation of the device of FIG. 1.

FIG. 3 is a somewhat enlarged side view in elevation of one of the transverse taping heads of the device of FIG. 1, shown adjacent a box in taping position with respect to the head.

FIG. 4 is a schematic view in perspective of a box with two L shaped pieces, or clips, of tape applied to one side and one end of the box.

FIG. 5 is a similar schematic view in perspective of the box of FIG. 4 with four L shaped pieces of tape applied thereto.

FIG. 6 is a somewhat enlarged end view partly in elevation and partly in section taken along the line 6—6 of FIG. 8 of the transverse taping head of FIG. 3 and associated parts.

FIG. 7 is an end view at the same enlargement, partly in section and partly in elevation, of a portion of the head of FIG. 6 broken away to show how the head is mounted.

FIG. 8 is a top plan view of the transverse head of FIG. 3 and associated parts.

FIG. 10 is a broken away side view showing the mounting for the tape supply and other parts associated with the taping head of FIG. 3.

FIG. 11 is a somewhat more greatly enlarged view partly in elevation and partly in section taken along the line 11—11 of FIG. 12 and showing the tape holding device of the taping head of the preceding figures.

FIG. 12 is an end view of the same tape holding device taken along the line 12—12 of FIG. 10.

FIG. 13 is an enlarged side view partly in section and partly in elevation of means for holding the box, or carton, of FIG. 1 in the taping position.

FIG. 14 shows a taping device according to a slightly different embodiment of this invention wherein only a side guide and no side clamp is utilized to position the box for taping.

FIG. 15 is a schematic side view in elevation of a pair of taping heads according to a still different embodiment of the invention wherein two heads work on opposite sides of a box in the same taping position.

FIG. 16 is a schematic view in elevation of still a different embodiment of a taping device according to this invention wherein either an L shaped or U shaped piece of tape may be applied to a rectangular article.

FIG. 17 is a view in perspective of a box with an L shaped piece of tape applied thereto by the apparatus of FIG. 17.

FIG. 18 is a similar view in perspective of the same box with a U shaped piece of tape applied thereto.

Figure 9:
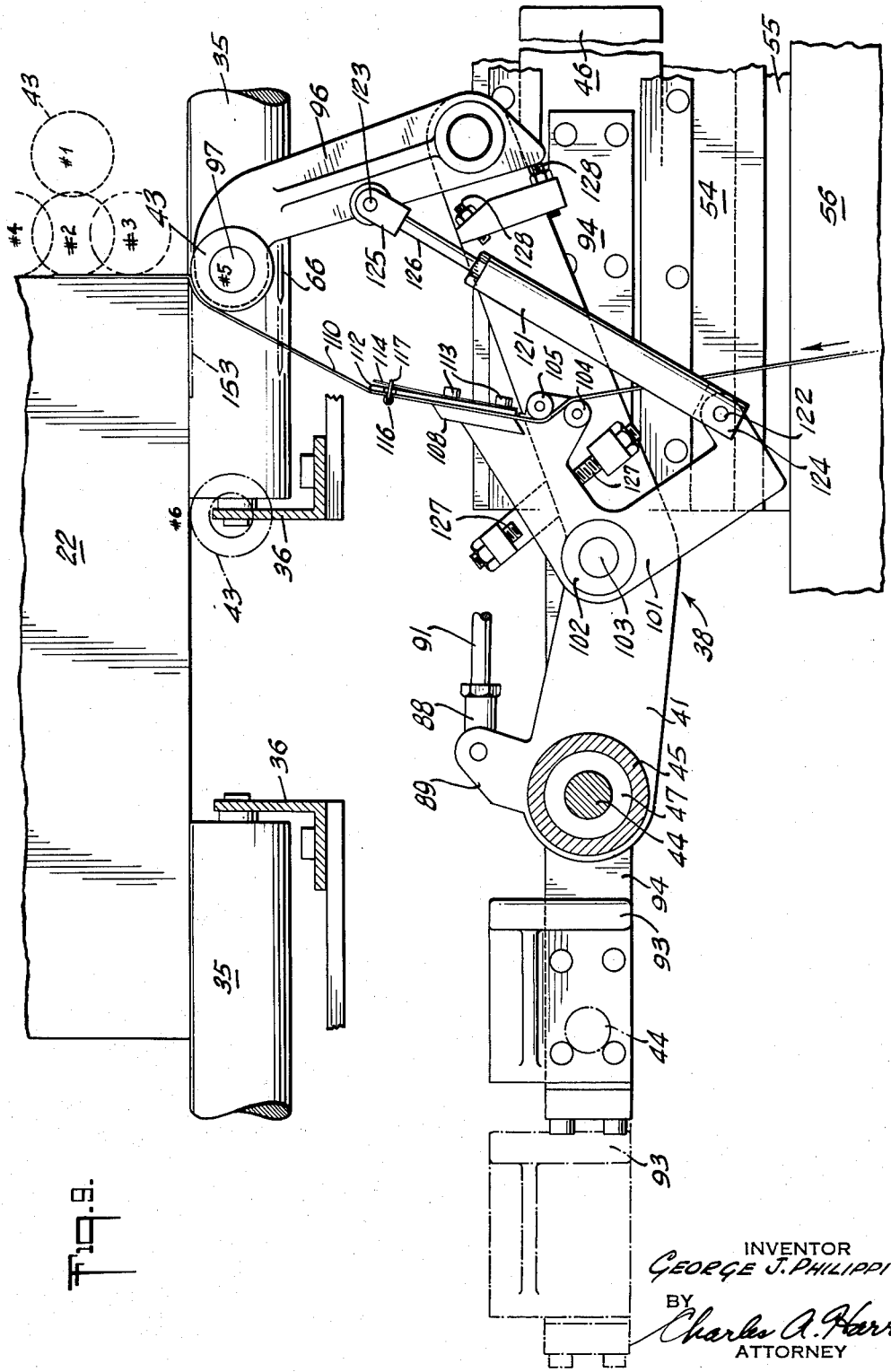
FIG. 9 is a side view in elevation of the taping head of FIG. 3 showing the head in position underneath the box as the tape is severed just prior to completion of application of the L shaped piece of tape to one corner of the box.

Referring in particular to FIGS. 1, 2, 4 and 5 of the drawings there is shown a taping device according to a preferred embodiment of the invention wherein L-shaped "clips," or lengths, 21, of tape are applied to rectangular boxes 22, such as cardboard cartons, at two taping stations I and II. The boxes 22 are automatically moved through the taping device by a conveyor table 23 comprising rollers 24 which are driven by chain drives 25 connected to a conventional source of power such as an electric motor, not shown. The rollers 24 are mounted in longitudinal girders 24a at opposite sides of the table. The boxes first are positioned and held in a ready position III by retractable stops A and B, whose operation will be described more fully hereinafter, and then released so that they are transported by the rollers 24 to the first taping position. The boxes 22 are accurately located in this position automatically by a guide plate 26 at one side of the box, a retractable stop 27 at the front of the box and pneumatically controlled top and side clamps 28 and 29, respectively, which press down on the top and the opposite side of the box.

At each taping position I and II, two taping heads are provided. In position I, a transversely operable taping head 31 is located on one side of the conveyor table 23 in such a way that it will operate on the side of the box opposite to the pneumatic side clamp 29 referred to above, and a longitudinal operable taping head 32 is provided to operate on the front of the box. An opening 33 is provided for the side taping head 31 in the adjacent longitudinal girder 24a supporting the conveyor rollers 24 and one of the rollers is removed so that a pathway or slot extends underneath the box 22 approximately along its transverse center line to allow the head 31 to apply tape to the bottom of the box. Similarly the longitudinal taping head 32 in position I is located in a well 34 provided for this purpose. The well is formed by utilizing eight short conveyor rollers 35, four at each side of the conveyor. These short rollers individually extend only about one-third of the distance across the conveyor so that it is necessary to provide a supporting member extending from the frame of the machine for rotatably mounting the inner ends of these rollers. A pair of such supporting members 36 are provided for this purpose and for defining the well 34, in which the longitudinal taping head 32 is located.

In position II there are two taping heads 31 and 32 identical with those of position I, except that they are located at opposite sides of the box. In other words, the transverse taping head 31 is located at the opposite side of the conveyor 23 and the longitudinal taping head 32 is positioned in a well 34 at the rear of the box, instead of in front of the box as in position I. Similarly, in position II a guide plate 26, retractable stop 27, and top and side pneumatically operated clamps 28 and 29 are provided which are identical with those of position I except for their locations.

*The taping heads*

As indicated above, the two transverse taping heads 31 are identical in their structure and function, and the two longitudinal taping heads 32 are likewise identical. It also is true that the transverse taping heads and the longitudinal taping heads operate the same way and are substantially identical in structure. The structure of the transverse and longitudinal heads differ only in such minor respects that the structure and operation of all of the heads will be described in detail by reference to only one of the transverse heads which has been shown in detail in FIGS. 3 and 6–13. The minor differences between the transverse and longitudinal heads will be described later, hereinafter.

Referring to FIGS. 3 and 6–13, there is shown a taping head comprising a taping unit 38 mounted to reciprocate in a taping slideway 38a and a cutting unit 39 mounted to reciprocate in a cutter slideway 39a. Both of the slideways are supported from the framework of the taping device and extend transversely thereof.

The taping unit 38 basically comprises a lever arm 41, a tape holding device 42 secured to the lever arm and an applicator roller 43 mounted from the upper end of the lever arm. The lever arm 41 is mounted for pivotal movement about a stub shaft, or pivot, 44, at the lower end of the arm and for forward movement of said pivot from an initial to a terminal position in a linear path predetermined by the taping slideway 38a. As shown most clearly in FIGS. 3, 6, and 7, the lower end of the lever arm 41 terminates in a hollow boss 45 which defines a concave cylindrical surface for receiving the pivot 44. The pivot stub shaft 44 is mounted on an elongated plate slide 46 which is adapted to move back and forth in the slideway 38a. The cylindrical surface of the boss is mounted for rotation on the stub shaft 44 via a pair of roller bearing races 47 and 48 held at opposite sides of the boss by a force fit therein in a conventional manner. The pivot 44 is secured to the sliding plate 46 by a bolt 49 passing through a recess 51 provided for this purpose in a plate. The slideway 38a, itself, comprises a pair of bars 52 and 53 secured by bolts 50 to a transversely extending structural L 54 carried on a spacer plate 55 mounted on a transverse support 56 extending between the side frames of the device, and a corresponding pair of guide plates 57 and 58 held against the bars by the same bolts 50 which fasten the bars 52 and 53 to the L-shaped member. The bars 52 and 53 are spaced vertically by a distance approximately equal to or slightly greater than the height of the slide 46 and the guide plates 57 and 58 are spaced one above the other so as to provide a transversely extending slot between them which is narrower than the height of the slide 46; thereby to hold the slide in contact with at least one of the bars 52 and 53 and the surface of the L-shaped member 54 and prevent its displacement from the slideway 38a.

The slide plate 46 is driven back and forth in the slideway 38a by a pneumatic driving cylinder 61 located on the opposite side of the L shaped member to the pivot. The driving cylinder 61 comprises a conventional reciprocating plunger 62 connected to the piston of the cylinder and the cylinder 61 is operated in a conventional manner by connection through pneumatic piping 63 at each end of the cylinder to an air source, not shown, which is controlled as described hereinafter. The cylinder 61 is bolted to the slide 46 via a rigid bar 64 connected to the outer end of the plunger 62, as best shown in FIGS. 3 and 8. Thus, when the plunger 62 of the driving cylinder 61 moves to the left in FIGS. 3 and 8, the slide 46 and the taping unit attached thereto also move to the left.

The cutting unit 39 basically comprises a vertical shaft 65, a cutter 66, and a cutter arm 67 mounted for pivotal swinging movement of the cutter 66 on the shaft 65. The cutter arm 67 is integral with a hollow vertical boss 68 presenting a concave cylindrical surface which fits over the vertical shaft 65 for pivotal movement thereon. The shaft 65 in turn is fixed to a horizontal slide plate 69 adapted to move back and forth in the cutter slideway 39a. The cutter slideway 39a is very similar to the taping slideway 38a in that it comprises a pair of spaced bars 71 and 72 and a corresponding pair of guide plates 73 and 74, all of which are bolted to a transversely extended L shaped structural member 75 attached to the framework of the taping device. Again, the bars 71 and 72 are spaced to receive the slide 69 and the guide plates 73 and 74 define a slot somewhat narrower than the width of the slide 69 so as to retain it in the slideway. The cutter slide 69 is driven from the taping slide 46 by a connecting plate 76 attached to the cutter slide 69 by four bolts 77 and to the taping slide 46 via a yoke structure at the opposite end of the plate 76. The yoke structure comprises a fork plate 78 depending from one end of the connecting plate 76 and bolted thereto, and a rod 79 secured to the taping slide 46 by a bracket 81 bolted thereto; the rod 79 being secured to the bracket 81 by a set screw 82 holding the end of the rod 79 in a hole in the bracket. The fork plate 78 defines a slot 83 which fits over the rod 79 and a pair of collars 84 are held on the rod by set screws 85 on opposite sides of the fork to prevent it from moving length-wise relative to the rod 79. Thus, the cutter slide 69 is drivably connected to the taping slide 46 through this structure.

The lever arm 41 is normally urged to an extended and upright position with respect to the path of the pivot 44 on the taping slide 46 by a pneumatic torsion cylinder 86. The torsion cylinder 86 is attached at one end to a plate 87 bolted to a taping slide 46 and at the other to a sleeve 88 pivotally mounted on a short arm 89 connected to the boss 45 on the lever arm. The torsion cylinder 86 is connected to the sleeve 88 by threads at the outer extremity of the plunger 91 of the torsion cylinder. The torsion cylinder 86 urges the plunger 91 to a fully extended position so that the torsion cylinder tends to push the short arm 89 forward and thereby rotate the lever arm 41 counterclockwise about the pivot 44, in FIG. 3. The lever arm 41 is held upright by an adjustable stop 92 tapped into a foot 93 extending sideways from and bolted to the slide 46 via the plate 94. This stop 92 may be adjusted to regulate exactly the upright position of the lever arm 41. The lever arm 41 may be rotated or pivoted clockwise about the pivot 44 by pressing the upper end of the lever arm to the right in FIG. 3 against the resistance of the torsion cylinder 86.

The applicator roller 43 is rotatably mounted from the outer end of the lever arm 41 on a connecting arm 96 which in turn is pivotally mounted on the lever arm 41. The applicator roller 43 rotates on a stub shaft 97 extending from the front end of the connecting arm. The connecting arm 96, in turn, is pivotally mounted on a stub shaft 98 extending from the outer end of the lever arm 41 through a hollow cylindrical boss 99 which fits over the shaft 98.

The tape holding means 42 is mounted at the end of one leg of an L shaped rocker arm 101 which in turn is pivotally mounted through a hollow cylindrical portion 102 on a stub shaft 103 connected to the lever arm 41 and located between the pivot 44 and the outer end of the lever arm. The tape holding means is shown in FIGS. 3, 6, 8, 9, and 10–12, and in detail in FIGS. 11 and 12. It comprises a pair of first and second rollers 104 and 105, one of which is knurled so that it presents a series of spaced circumferential ridges 106 to the tape; a tape holding plate 107 secured by bolts 113 to a flange 108 integral with the top leg of the L shaped rocker arm 101, and resilient means for holding the outer end of the tape 110 in tape applying position against the under side of the plate 107. The tape is drawn up from a supply roll, the nature and control of which will be described more fully hereinafter, and threaded between the spaced rollers 104 and 105 in such a way as to pass over the knurled surface of the first roller 104 and then underneath the plate 107. The bolts 113 which secure the plate 107 to the flange 108 also hold a bent leaf spring 114 against the lower end of the top surface of the plate 107. The upper end 115 of this leaf spring tends to move to a position spaced from the outer end 112 of the plate 107. A wire spring comprising a lower coil portion 116 and hooked ends 117 which fit around the sides of the plate 107 is located adjacent the outer extremity of this plate. The distance between the hooks 117 is somewhat less than the over all width of the plate 107 and recesses 118 are provided in the side edges of this plate to hold the hooks in position and prevent them from sliding up and down on the plate 107. The hooks 117 extend over and around the outer end 115 of the leaf spring so that the coil portion 116 connected to the hooks normally is urged upwardly against the bottom of the plate 107. Thus, when the tape 110, which has been threaded between the rollers 104 and 105, is led beneath the plate 107 between the coil 116 and the bottom surface of the plate, it is held extended in taping position against the plate by the pressure of the coil. To further prevent the tape from being pulled back underneath the plate 107 and through the rollers 104 and 105 by the tension applied to the tape prior to the rollers, a leaf spring 109 urged toward the bottom of the plate 107 is mounted on the L shaped arm 101 below the plate. The spring 109 does not interfere with movement of the tape toward the outer end 112 of the plate 107. However, if the tape begins to move back towards the rollers 104 and 105, it is braked by contact with the end of the spring 109 which tends to stick to the adhesive side of the tape when it is pulled in this direction.

A pneumatic positioning cylinder 121 is connected between the outer end of the other leg of the L shaped rocker arm 101 and the middle of the connecting arm 96 holding the applicator roller 43 through suitable pivot pins 122 and 123 affixed to the respective arms. The pin 122 on the rocker arm 101 is pivotally mounted in a socket 124 at one end of the cylinder, itself, and the pin 123 on the connecting arm 96 is pivotally mounted in a socket 125 at the end of the plunger 126 for the positioning cylinder 121.

The exact position of the rocker arm 101 is determined by adjustable stops 127 extending from the lever arm 41 which press against opposite sides of the upright leg of the rocker arm. The positioning cylinder 121 is utilized for moving the applicator roller 43 from one position to another, during the taping cycle, by rotating the connecting arm 96 about its pivot point in a manner which will be described more fully hereinafter. Adjustable positioning stops 128 also are attached to the upper end of the lever arm 41 for contact with adjacent portions of the connecting arm 96 to assure that the connecting arm is not moved beyond certain points by the positioning cylinder 121.

The cutter arm 67 and the hollow boss 68 of the cutting unit normally are held in the retracted position of the cutter 66 by a solenoid 130. The solenoid 130 is connected to the cutter boss 68 by a connecting link 131 which is pinned at one end through an extension 132 of the solenoid core, and at the other end through a pair of ears 133 extending from the bottom of the boss. In one position of the solenoid 130, shown in dotted lines in FIG. 8, the cutter 66 is retracted. In the other position of the solenoid shown solid in FIG. 8, the cutter is fully extended. It should be noted that for the positions of the taping and cutting units shown in FIGS. 6 and 8 and related figures, the cutter 66 is actually retracted. It is merely shown solid in its extended position for the sake of clarity. As the cutter 66 moves from its retracted to its fully extended position, it slices through the tape in the path of the cutter from edge to edge of the tape. The cutter strikes the tape at an angle so that its full force initially is concentrated at one edge of the tape and the tape is positively cut from edge to edge as the cutter moves to its extended position. This type of cutting action is highly advantageous in severing strong tapes such as reinforced strapping tapes and avoids the necessity of using clamps or anvils during cutting.

*Operation*

In operation, a box 22 located in the ready position III is released and carried by the driven rollers 24 to taping position I by lowering stop B and raising stop A in a manner which will be described more fully hereinafter.

Referring particularly to FIGS. 2 and 13, just before the box 22 reaches the first taping position, it contacts limit switch L–1 which activates a control cylinder 134 for the front stop 27 and brings this stop to its down position for holding the box against further forward motion on the conveyor table.

The front stop comprises a lever arm 135 pivotally mounted at one end on a pin 136 extending from a bracket 137 attached to a clamping enclosure 138 which, in turn, is secured to the longitudinal girders 24a of the taping device. A positioning arm 139 is attached to the lever arm 135 for swinging it between the two positions shown (in full and in phantom) in FIG. 13. The outer end of the positioning arm 139 is pivotally secured to an extension 141 of the plunger 142 of the control cylinder 134 so that as the plunger moves in and out, it moves the stop down and up, as indicated in FIG. 13. A swinging arm 143 for contacting the box is pivotally mounted at the outer end of the lever arm 135. While this swinging arm 143 normally would hang vertically due to its own weight, it is prevented from doing so by a limit switch L-2 mounted on the lever arm. When the box 22, moving into taping position I, contacts the end of the swinging arm 143, it straightens it against the resistance of the limit switch L-2 until the swinging arm reaches a vertical position and the switch L-2 is tripped to activate a pneumatic clamping cylinder 144 driveably connected to a clamping plate 145 of the vertical clamp 28. The clamping plate 145 then moves downwardly and presses upon the top of the box 22. At the same time, a similar clamping cylinder, not shown, for the horizontal clamp 29, at one side of the box in this position, is activated to press the box against the oppositely located guide plate 26. Thus, the box 22 is held firmly in taping position I by the front stop 27, the top clamp 28 and the side clamp 29, and the transverse center line of the box is approximately in line with the path of the transverse taping head 31 in this position.

The taping cycle

As indicated hereinbefore, the transverse taping heads 31 and the longitudinal taping heads 32 are substantially identical in structure and operation. The major difference in structure between them is indicated by comparing FIGS. 2 and 3. It will be noted that the taping slides 46 and associated parts for the longitudinal heads are located substantially below the same parts for the transverse heads. This is necessary to provide space for the parts and allow the operation of the transverse and longitudinal heads along taping paths which would intersect if they were in the same plane. As will be noted from FIG. 2, the lever arms 41 of the longitudinal taping heads 32 are considerably longer than the lever arms 41 of the transverse taping heads 31, since they must extend a greater distance because their slides 46 are positioned below the slides 46 for the transverse taping heads. Even though the slides for the transverse and longitudinal taping heads in a given position, say position I, are at a different level, they cannot move in the same direction throughout their paths at the same time because they would interfere with one another. Therefore, they are timed so that they work in an alternating or "see-saw" sequence wherein the transverse head is up when the longitudinal head is down and vice versa.

As the box 22 moves into taping position I the transverse head 31 is upright and in a position to begin its movement towards the box to apply tape thereto, whereas the longitudinal head 32 is down underneath the box and ready to begin its return stroke to a position where it can move toward the box to apply tape thereto. In this position, the longitudinal head 32 is held down, when the box is not in place by a cam plate 147 located just below the box at approximately the point where the longitudinal and the transverse center lines of the box intersect. As the applicator roller 43 rides along the bottom of the box just after rolling the end of the L shaped piece of tape into contact with the box it strikes the cam plate 147 and rides under it where it remains at the end of the forward stroke of the longitudinal taping head 32.

Movement of the vertical clamping plate 145 downwards toward the box 22 releases a control switch L-3, which is held open in the uppermost position of the clamp by a bracket 148 extending between the switch and the clamp, and begins the taping cycles for both taping heads. As indicated above, the operation of the transverse and longitudinal taping heads is the same except that they are out of phase with one another by one-half a cycle with the result that when the transverse head 31 starts toward the box the longitudinal head 32 starts to move out from under the cam plate 147 and along the bottom of the box toward the position where it will be able to approach the box and apply tape thereto. Thus, the operation of both the transverse and longitudinal heads will be described by reference to the transverse head shown in detail in the drawings.

The control switch L-3 which begins the taping cycle activates the driving cylinder 61 so that the taping slide 46 together with the cutter slide 69 begins to move toward the box 22 and the pivot 44 for the lever arm 41 begins its movement in this direction along its predetermined linear path corresponding to that of the taping slide. As the head approaches the box 22 the lever arm 41 is in its upright, or extended, position with the end of the arm opposite to the pivot 44 away from the linear path of the pivot. During this time, the applicator roller 43 also moves toward the box 22 in a linear path corresponding to, and in fact parallel to, that of the pivot so that the roller 43 will strike the side of the box as the head continues movement in this direction. In FIGS. 3 and 9 the initial position of the applicator roller 43 at the beginning of the taping cycle is identified by the numeral 1. The position of this roller when it first strikes the side of the box is marked 2. After the applicator roller 43 strikes the side of the box 22 it can no longer move in its initial path parallel to the path of the pivot 44 but can only move downwardly along the side of the box (provided that the lever arm can swing in this direction), as the pivot 44 continues its horizontal movement underneath the box.

As shown schematically in FIG. 2, and as indicated in part in FIGS. 6 and 8, a cam bar 150 is attached to the plunger 62 of the driving cylinder 61 on the side opposite to the taping slide 46, itself, by a collar 151 secured to the plunger 62 and a fitting 152 connecting the collar to the cam bar. The cam bar 150 extends parallel to the axis of the plunger 61 on one side of the cylinder and a series of four control switches, L-4 to L-7, are arranged along the bar 150 in such a way that when the taping slide 46 is in its initial position, the contacts on all of the switches will be depressed. The same is true of the cam bar 150 for the longitudinal taping head 32 except that in the initial position of the longitudinal head the plunger and the cam bar are thrust forward, or extended, and all of the switches in the position are released instead of depressed, as shown roughly in FIG. 2.

As the applicator roller 43 moves from point 1 to point 2, it contacts the end of the tape 110 positioned in the path of the applicator roller 43 and presses the adhesive side of the tape into contact with the side of the box 22. Since the end of the tape presented by the tape holding means 42 is long enough to assure that it will fit between the applicator roller 43 and the box, the roller will strike the box slightly below the end of the tape. Thus, initially there will be a short length of tape above the applicator roller 43 which is not pressed into adhesive contact with the box. For this reason, a short while after the applicator roller 43 begins to move downwardly along the side of the box, i.e., when it reaches point 3 in FIGS. 3 and 9, the cam bar 150 releases control switch L-4, activating the positioning cylinder 121 on the lever arm to pivot the connecting arm 96 upwardly and move the applicator roller 43 to point 4 in FIGS. 3 and 9, above the end of the tape already applied to the box. As the roller moves from point 3 to point 4, it rolls along the tape and pushes the initial end of the tape into firm adhesive contact with the side of the box. Then, as the taping slide 46 and the pivot 44 continue their forward movement under the box, the applicator roller 43 rolls downwardly along the side of the box and rounds the corner thereof. Just after the applicator roller passes around the corner of the box and reaches point 5 in FIG. 9, the cam bar 150 releases control switch L-5 which actuates the solenoid 130 of the cutting unit 39 and causes the cutter 66 to swing out and slice through the tape from edge to edge. The applicator roller 43 then continues its movement along the bottom of the box 22 and rolls the remaining end 153 of the tape into firm adhesive contact therewith, so that the tape adhered to the side and bottom of the box assumes the form of an L shaped "clip" or length of tape. The applicator roller 43 continues its forward motion along the bottom of the box until it reaches point 6 which represents the end of the forward stroke for the transverse taping head. At this point the cam bar 150 releases control switch L–6 which reverses the driving cylinder 61 and causes the transverse head 31 to begin its return stroke. Simultaneously, the switch L–6 causes the longitudinal head 32 to begin its forward stroke toward the front end of the box to apply an L shaped "clip" thereto.

As shown most clearly in FIG. 10 for the transverse taping head 31 and as indicated schematically in FIG. 2 for the longitudinal taping head 32, to prevent the head from fouling the box 22 and, in particular, to prevent the tape extending from the lever arm 41 from sticking to the box on the return stroke of the heads, a flat spring cam 154 is located in the path of the applicator roller 43 just before the applicator roller 43 rounds the corner of the box 22 on the forward stroke of the taping head and just after it rounds the corner of the box on its return stroke. The portion of the cam 154 in the path of the roller is in the form of a spring 155 which is capable of being depressed downwardly to allow the roller to continue along its path past the spring, but which is incapable of being removed from the path of the roller in this fashion when the roller is moving upwardly. Thus, on the return stroke of the taping head the spring 155 blocks the applicator roller 43 and causes it to move underneath the cam 154 until it reaches the curved end thereof where it is free to move upwardly to the initial or extended position of the lever arm 41. Although the shapes of the spring cams 154 for the transverse head and longitudinal head 31 and 32 are somewhat different due to the difference in the lengths of the lever arms for these heads, the cams operate in essentially the same way to perform the same function for both heads.

As the transverse head 31 continues its return stroke, the cam bar 150 first depresses control switch L–5 to return the cutter 66 to its initial position and then depresses control switch L–4 to return the applicator roller 43 to its initial position. Just after the applicator roller contacts the spring cam 154 on its return stroke and begins to roll along the under side of the cam, the cam bar 150 depresses control switch L–7 which activates the control cylinder for the front stop 27 to raise the stop. As the stop 27 rises, it activates control switch L–2 which, in turn, activates the clamping cylinders for the side and top clamps 28 and 29, thereby releasing the box in taping position I so that it immediately begins to move forward along the continuously driven rollers 24 of the conveyor table toward taping position II. When vertical clamp 28 rises it contacts control switch L–3 which, in turn, activates similar electro-pneumatic control mechanisms for stop A and stop B, so that stop B is depressed to allow the box in the ready position to begin movement toward taping position I and stop A is raised to prevent the remaining boxes from moving forward. Although not previously mentioned, early in the forward stroke of the taping head the cam bar 150 releases control switch L–7 to again depress stop A and raise stop B and allow one more box to reach the ready position.

In taping position II, the transverse head 31 operates on the opposite side of the box 22 and the longitudinal head operates on the rear of the box.

However, since the transverse taping heads are up and the longitudinal taping heads are down and held in a position beneath the level of the boxes by the plate cams as the box approaches taping position II, the clamps, the front stop and the transverse and longitudinal taping heads operate in exactly the same manner in taping position II as they do in taping position I.

The tape supplies for both the transverse and longitudinal heads 31 and 32 are in the form of tape rolls 156 carried on braked drums 157 mounted on brackets 158 bolted to a transverse member 159 adjustably secured to the framework of the taping device by a pair of slotted brackets 161. In the rolls, the tape is wound in convolutions upon itself with the pressure-sensitive side of the tape facing inwardly. In each case, roll is held on the drum 157 by a press fit with tapered portions 162 of the drum. The drum is braked by a spring 163 mounted on a central shaft 164 pressing a collar 165 inwardly against the drum. The tension on the tape 110 leaving the roll supply also is controlled by a roller 166 extending from the end of a positioning arm 167 which also is mounted on the central shaft 164. The end of the positioning arm 167 is urged toward the tape by a second spring 168 coiled around the shaft. This spring 168 is shown in phantom for the transverse head tape supply, but not for the longitudinal head. Suffice it to say, that the structure associated with the tape supplies and the mountings for the tape supply rolls are the same for both transverse and longitudinal heads. Control switches L–8 and L–9 (FIG. 2) are provided adjacent the tape roll supplies for the transverse and longitudinal heads, respectively, to stop the conveyor table when the tape rolls are empty and thereby assure that the machine is properly loaded with tape.

FIG. 14 illustrates a taping device according to a somewhat different embodiment of the invention wherein no side clamp is used to hold the box 22 in taping position, but instead a guide plate 170 is located along the side of the conveyor table opposite to that of the transverse taping head. Thus, as the box 22 approaches the transverse and longitudinal heads 31 and 32, it is led into taping position by the side plate 170 and stopped in taping position in the manner described in connection with the embodiment of the preceding figures. Similarly, a top clamp 171 is employed to hold the box in position during operation of the taping heads.

Still another embodiment of the invention is shown schematically in FIG. 15. Here a pair of transverse taping heads 31 operate on opposite side corners of a box 22 at the same taping station. These heads, which are of the same general structure as those shown in more detail in the preceding figures, operate from a common yoke and slide 172 in an alternating or "see-saw" sequence back and forth on a slideway comprising two bars 173. Thus, when one head 31 and its corresponding applicator roller 43 is up, as shown at the right of FIG. 16, and beginning its approach toward the box, the opposite head 31 is down underneath the box just after having applied a tape "clip" thereto. As described hereinbefore for the longitudinal taping head of FIG. 2, a plate cam 147 is provided underneath the box 22 to hold one of the heads in the down position after the box is removed from the taping position. The box 22 may be held in the taping position by a suitable clamp and a stop, or stops, not shown. Due to the differences between the height of their pivots, the lever arms 41 for the opposite heads are of different lengths corresponding somewhat to the difference in length between the transverse and longitudinal heads of the previous embodiments. The tape roll supplies 156 for the two heads are located along the sides of the device outwardly of the slide 172. Otherwise, the structure and operation of the taping heads of this embodiment is essentially the same as described in detail hereinbefore for the preceding embodiments.

FIG. 16 shows a still different embodiment of this invention wherein a relatively long slideway 174 is provided for the pivot end 175 of the lever arm on one taping head and the slideway is curved so that it comprises two legs 176 and 177 extending at right angles to one another.

In order that it may follow such a curved track, the pivot for this lever arm is carried by a truck 178 which, in turn, comprises a body portion and four wheels 179 which ride in the track. The truck 178 may be driven around the track by a continuous chain drive 181, such as shown schematically in dotted lines in FIG. 17. Otherwise the structure of this taping head is essentially the same as those of the previous embodiments. The arrangement allows the taping head to apply only an L shaped length or "clip" to the upper corner of the box as shown in FIG. 17, or to apply a full sized L shaped clip extending from the top down one side and around the bottom of the box as shown in FIGS. 16 and 18. Apparatus of this type may be regulated to apply an L or a U shaped clip merely by adjusting the timing mechanisms.

In all of the electro-pneumatic devices referred to hereinbefore, conventional equipment and circuitry may be employed to drive and control the various pneumatic cylinders from conventional electric limit switches and similar devices.

Although the taping heads in all of the embodiments shown operate on the corners presented at the bottom of the box, it is an important advantage of this invention that the heads may be arranged to move vertically, upside down, cross-ways, etc., to apply tape to two vertical surfaces, to the top of a horizontal surface and an abutting vertical surface, or the like; as well as to operate at any angle which may be dictated by the shape of the article to be taped.

Having now described the invention in specific detail and exemplified the manner in which it may be carried into practice, it will be readily apparent to those skilled in the art that innumerable variations, modifications, applications, and extensions of the basic principles involved may be made without departing from its spirit and scope.

The invention claimed is:

1. A taping device comprising a lever arm mounted for pivotal movement about a pivot at one end of the arm and forward movement of said pivot from an initial to a terminal position in a predetermined linear path; said lever arm normally being urged to an extended position with the end of said arm, opposite to said pivot, away from said linear path; roller supporting means mounted on said lever arm adjacent the opposite end of said arm for movement with respect to said arm from one position to another; an applicator roller rotatably mounted on said supporting means; said roller together with its supporting means, in the extended position of said lever arm and during the forward motion of said arm, being adapted to move in an initial path parallel to the linear path of said pivot; means responsive to the positioning of an article having a substantially rectangular corner to be taped in front of said lever arm in the initial path of said applicator roller to cause said arm and said roller to begin forward movement toward said article; tape holding means connected to said lever arm for positioning the free end of the tape between said roller and said article as the roller advances toward said article; positioning means connected to said roller supporting means for controlling the position of said roller with respect to said lever arm and said tape holding means; the continued forward movement of said lever arm causing said roller to press the free end of the tape against the side of the article and thereafter causing said lever arm to pivot backwardly toward said linear path and said roller to move over the article away from the free end of the tape while pressing said tape into adhesive contact with said article; said positioning means being activated to reverse the movement of said roller, after the roller adheres a portion of the tape to said article, and cause said roller to move back over the tape to a new position on said article beyond the end of the tape, thereby assuring that the end of the tape is pressed into adhesive contact with the article; the applicator roller in its new position being spaced substantially from said tape holding means and being held in that position by said positioning means as the lever arm continues its forward linear motion; further forward movement of said lever arm causing said lever arm to pivot further backwardly and allow said roller to move around said article while pressing said tape into further contact with the article; cutting means mounted for movement between said roller and said tape holding means in a given position of said lever arm and presenting an edge for slicing through said tape during said movement; and automatic means for initiating the movement of said cutting means when the given position of said lever arm is reached.

2. A taping device comprising a lever arm mounted for pivotal movement about a pivot at one end of the arm and forward movement of said pivot from an initial to a terminal position in a predetermined linear path; said lever arm normally being urged to an extended position with the end of said arm, opposite to said pivot, away from said linear path; an applicator roller mounted from said lever arm adjacent the opposite end of said arm for movement, in the extended position of said lever arm and during the forward motion of said arm, in an initial path parallel to the linear path of said pivot; means responsive to the positioning of a rectangular article to be taped in front of said lever arm in the initial path of said applicator roller to cause said arm and said roller to begin forward movement toward said article; tape holding means connected to said lever arm for positioning the free end of the tape between said roller and said article as the roller advances toward said article; the continued forward movement of said lever arm causing said roller to press the free end of the tape against the side of the article and thereafter causing said lever arm to pivot backwardly toward said linear path and said roller to move over the article away from the free end of the tape while pressing said tape into adhesive contact with said article; further forward movement of said lever arm causing said lever arm to pivot further backwardly and allow said roller to move around a corner of said article while pressing said tape into further contact with the next side of said article; cutting means mounted for movement between said roller and said tape holding means in a given position of said lever arm and presenting an edge for cutting through said tape; and automatic means for initiating the movement of said cutting means and causing said tape to be cut by said edge when the given position of said lever arm is reached.

3. A taping device according to claim 2, which further comprises supporting means for said applicator roller mounted on said lever arm adjacent the opposite end of said arm for movement with respect to said arm from one position to another; and positioning means connected to said roller supporting means for controlling the position of said roller with respect to said lever arm and said tape holding means; said positioning means being activated to reverse the movement of said roller, after the roller adheres a portion of the tape to said article but before the roller rounds the corner of said article, and cause said roller to move back over the tape to a new position on said article beyond the end of the tape, thereby assuring that the end of the tape is pressed into adhesive contact with the article; the applicator roller in its new position being spaced substantially from said tape holding means and being held in that position by said positioning means as the lever arm continues its forward linear motion.

4. A taping device according to claim 3, wherein said roller supporting means is in the form of a connecting arm pivotally supported at one end from the opposite end of the lever arm, the applicator roller being mounted from the other end of said connecting arm and the positioning means being connected to said connecting arm between its ends to swing the arm from one position to another.

5. A taping device according to claim 2 which comprises a pair of lever arms mounted on a common slide for reciprocal motion underneath the box, said lever arms being approximately 180° out of phase with one another so that when one arm is up ready to begin its taping motion, the other is down having completed this motion.

6. A taping device according to claim 2, wherein said cutting means is adapted to slice through said tape from one of its edges to the other in the movement of said cutting means between the applicator roller and the tape holding means.

References Cited by the Examiner

UNITED STATES PATENTS

| 2,841,305 | 7/58 | Werner | 156—355 |
| 3,027,292 | 3/62 | Rothenberger | 156—468 |

FOREIGN PATENTS

| 861,304 | 2/61 | Great Britain. |

EARL M. BERGERT, *Primary Examiner.*

UNITED STATES PATENT OFFICE
CERTIFICATE OF CORRECTION

Patent No. 3,212,950                                                    October 19, 1965

George Jacob Philippi

It is hereby certified that error appears in the above numbered patent requiring correction and that the said Letters Patent should read as corrected below.

Column 11, line 11, for "L" read -- U --.

Signed and sealed this 9th day of August 1966.

(SEAL)
Attest:

ERNEST W. SWIDER
Attesting Officer

EDWARD J. BRENNER
Commissioner of Patents